Nov. 24, 1953  R. W. HUGHES  2,660,154
EXPANSION ENGINE
Filed Sept. 21, 1951  4 Sheets-Sheet 1

INVENTOR:
ROBERT W. HUGHES
BY
ATTORNEY

Nov. 24, 1953     R. W. HUGHES     2,660,154
EXPANSION ENGINE
Filed Sept. 21, 1951     4 Sheets-Sheet 2
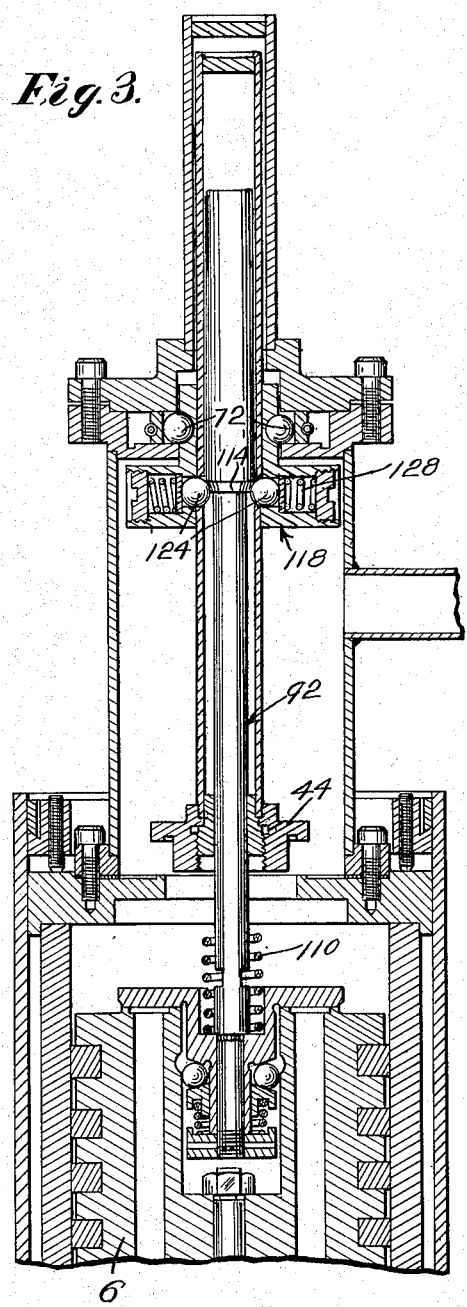
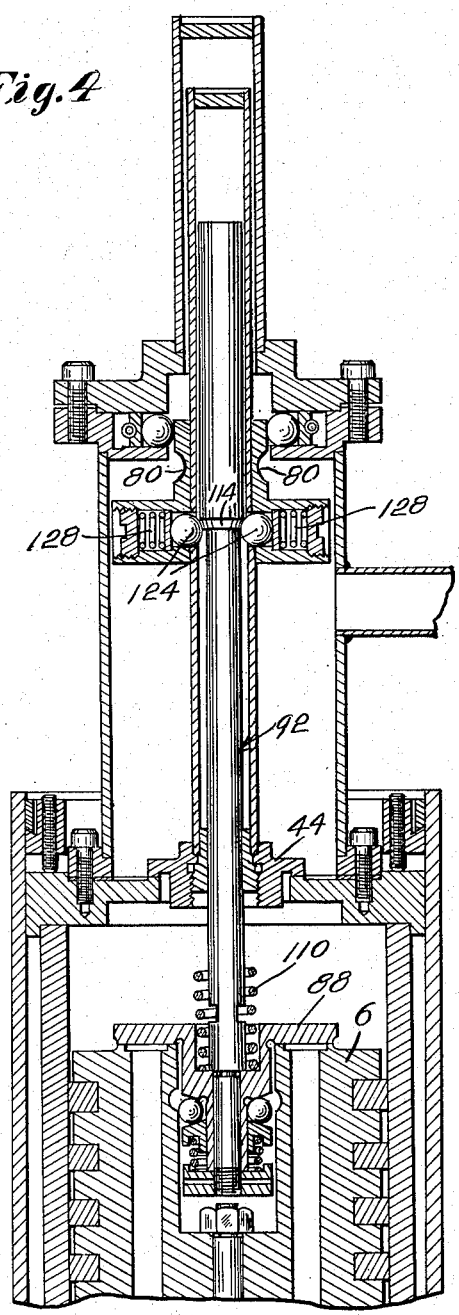
INVENTOR:
ROBERT W. HUGHES
BY John F. Schmidt
ATTORNEY Nov. 24, 1953 R. W. HUGHES 2,660,154
EXPANSION ENGINE
Filed Sept. 21, 1951 4 Sheets-Sheet 3
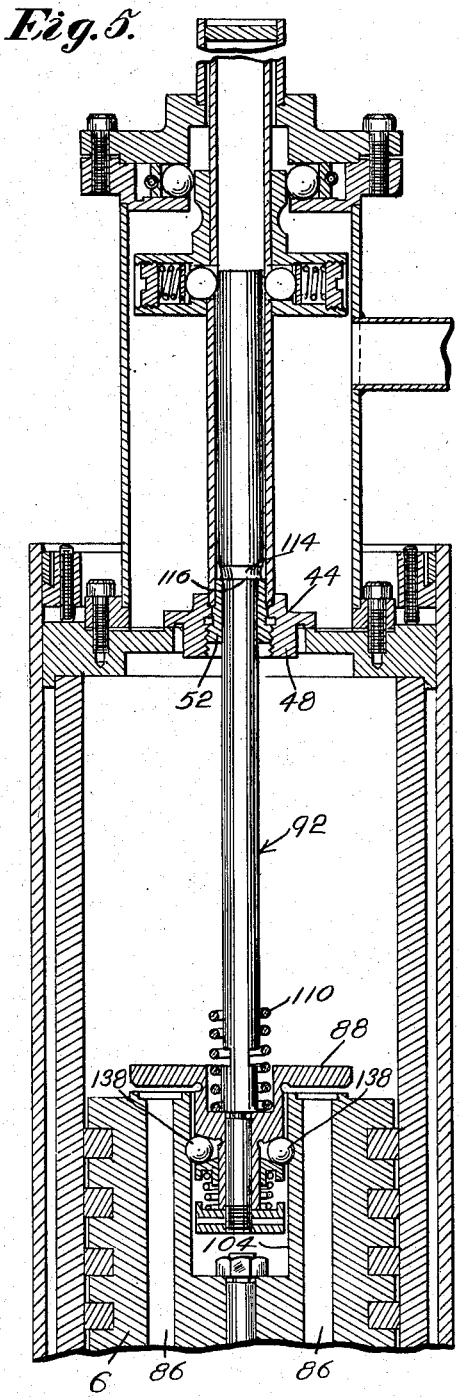
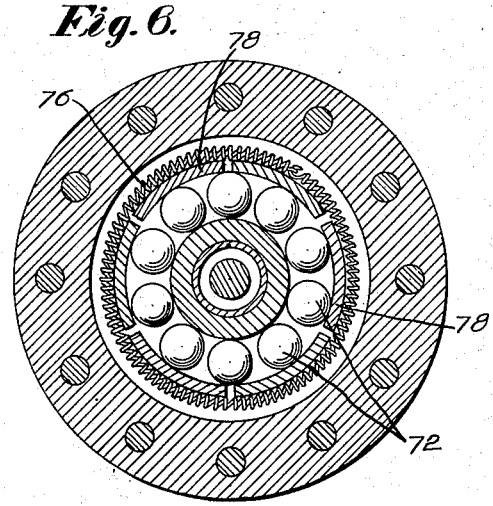
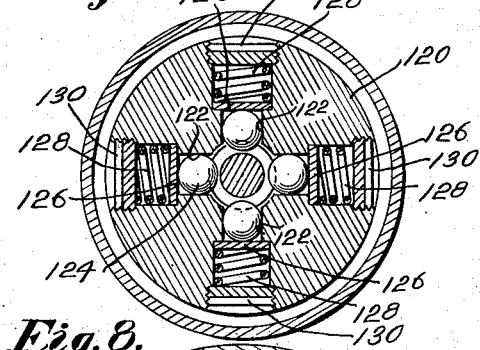
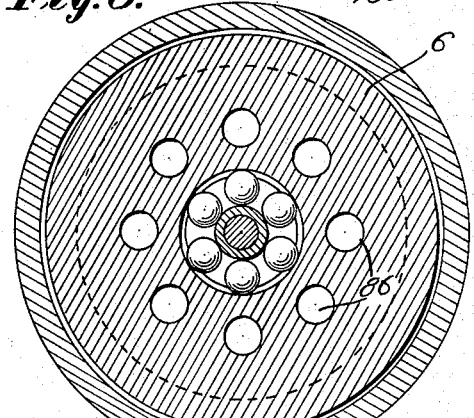
INVENTOR:
ROBERT W. HUGHES
BY John F. Schmidt
ATTORNEY Patented Nov. 24, 1953

2,660,154

UNITED STATES PATENT OFFICE 2,660,154

EXPANSION ENGINE

Robert W. Hughes, Michigan City, Ind., assignor to Joy Manufacturing Company, Pittsburgh, Pa., a corporation of Pennsylvania Application September 21, 1951, Serial No. 247,731

30 Claims. (Cl. 121—123)

This invention relates to an expansion engine, especially to an expansion engine of the reciprocating piston type.

The commercial production of oxygen for industrial uses may be accomplished in a number of different ways, one of these being disclosed and claimed in the copending patent application Serial No. 236,014, filed July 10, 1951, which is the invention of Samuel C. Collins, and is assigned to the assignee of this invention. The method and apparatus therein disclosed and claimed for the production of oxygen involves providing a substantial quantity of refrigeration. The necessary refrigeration is desirably provided by expanding the air, after the removal of impurities, with the performance of external work, such expansion conventionally taking place in an expansion engine. My invention relates to an improvement in an expansion engine for use in apparatus for the separation of gases such as disclosed and claimed in the above identified patent application of Dr. Collins.

The extremely low temperatures encountered in the separation of air into its components presents numerous design problems, one of which involves the difficulty of packing an engine of conventional design. It will of course be appreciated that inefficient packing will result in blow-by of cold air, involving a serious loss of refrigeration.

It is accordingly an object of this invention to provide an expansion engine adapted to low temperature operation and requiring a minimum of rod packing, and further requiring a minimum pressure differential where rod packing is necessary. This and other objects are accomplished in an expansion engine in which valve push-rod packing is entirely eliminated, and in which the piston rod packing is subject to expansion engine exhaust pressure instead of inlet pressure whereby the pressure differential across the packing is materially reduced and whereby the loss of valuable refrigeration is eliminated.

In the drawings:

Fig. 3 is a view similar to Fig. 1 but showing the parts in position to begin cut-off—i. e., closing of the admission valve.

Fig. 4 is a view similar to Fig. 1, but showing the parts in their relationship with the admission valve completely closed—i. e., cut-off is complete and expansion is ready to begin.

Fig. 5 is a view similar to Fig. 1, but showing the parts in their relationship in which the exhaust valve is wide open, and the piston is at bottom dead center.

Figure 1:
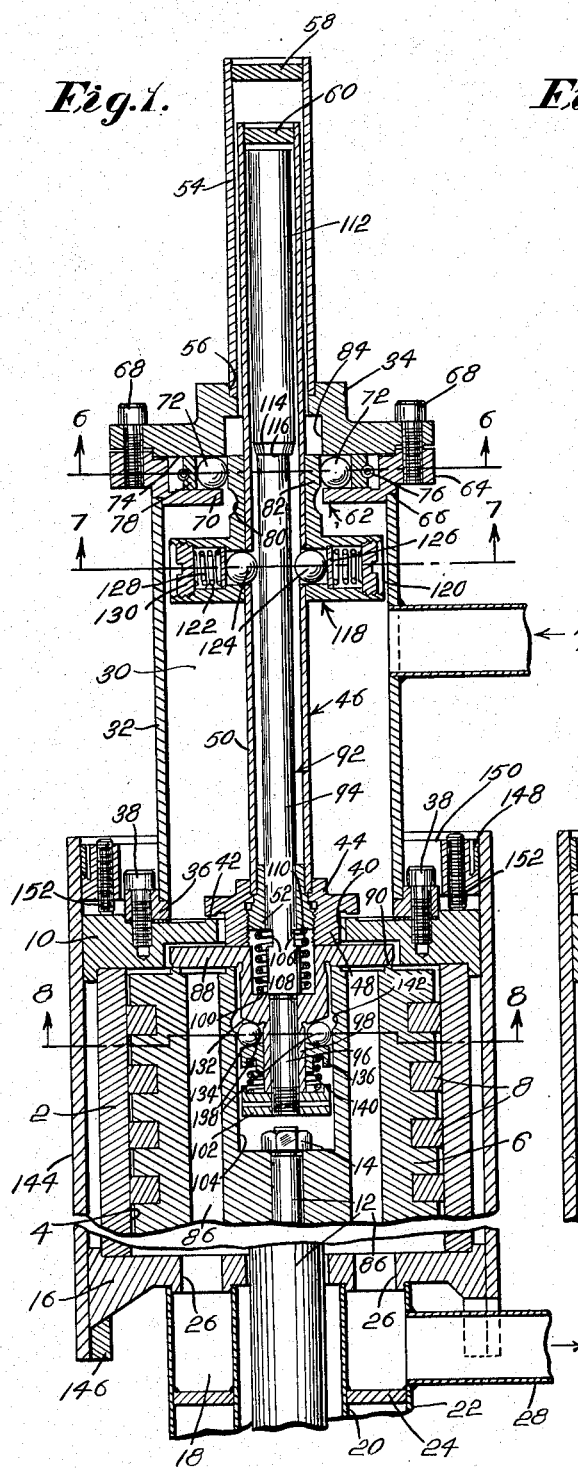
Fig. 1 is a longitudinal sectional view through the cylinder of an expansion engine made according to this invention, but not showing the crankshaft, connecting rod, and crosshead, which are conventional. The parts are shown in this figure in their relation with the piston at top dead-center, showing the admission valve in the process of opening.
Figure 2:
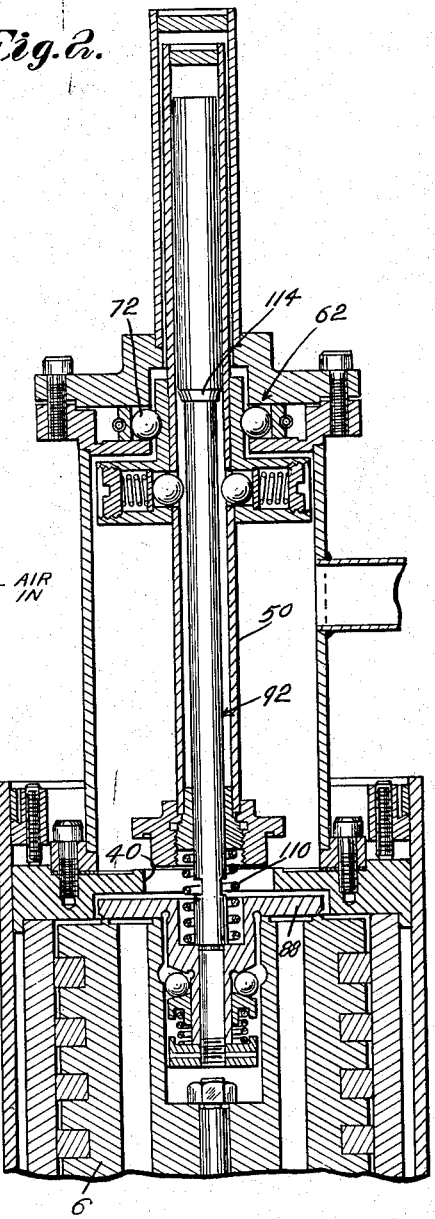
Fig. 2 is a view similar to Fig. 1, but with the admission valve shown in its wide open position.

Figs. 6, 7 and 8 are views in section substantially on lines 6—6, 7—7 and 8—8 respectively of Fig. 1, with the qualification that Fig. 8, for simplification, is shown without the cylinder head clamping sleeve.

Figure 9:
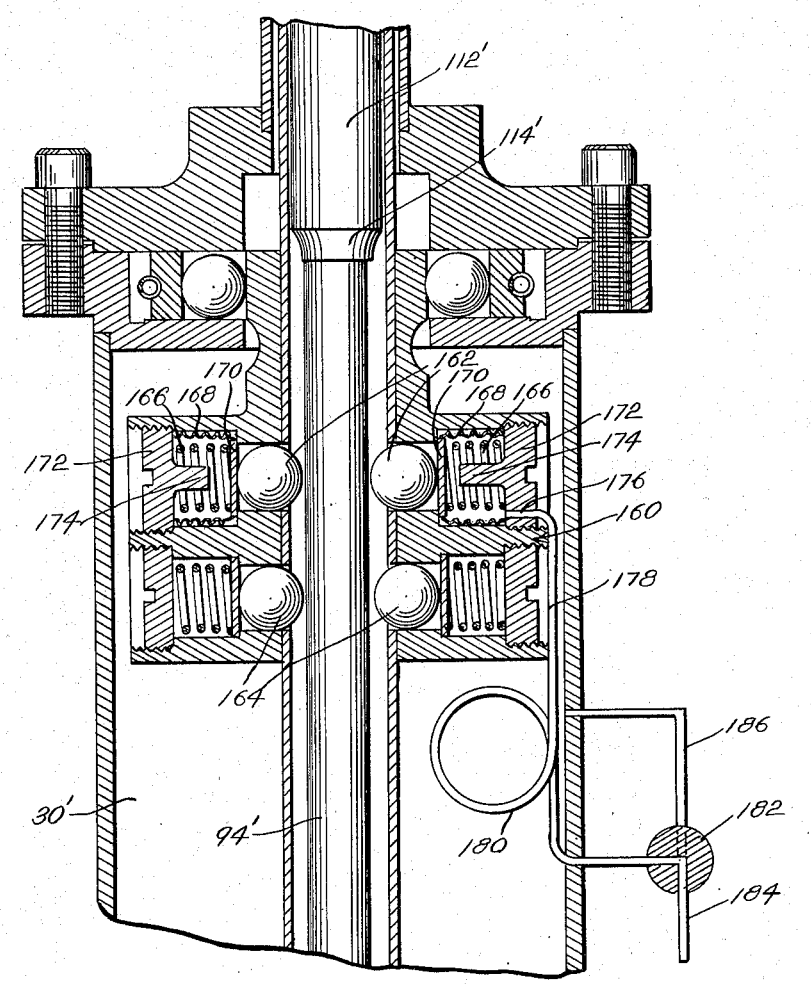

Fig. 9 shows a modified resilient device to permit long or short cut-off.

In an expansion valve made according to this invention and shown in the drawings, there is provided a cylinder 2 having the usual highly polished bore 4. The piston 6 having a plurality of piston rings 8 is reciprocably mounted in the cylinder 2. An end-wall 10 is provided for one end of the cylinder 2. A piston rod 12 is secured to the piston 6 in any suitable manner, as for example by means including a threaded member 14. The piston rod 12 extends outward through the opposite end of the cylinder.

The aforesaid opposite end of the cylinder 2 is closed off by a lower end-wall 16, to which there is secured an exhaust chamber 18. Exhaust chamber 18 preferably comprises a pair of cylindrical sleeves 20 and 22 secured to the lower end-wall 16 in any suitable manner and defining an annular space between them which is sealed off by a toroidal head 24 secured to the two sleeves 20 and 22. Openings 26 are spaced around the piston rod 12 in the lower end-wall 16 in order to connect the interior of cylinder 2 with the chamber 18. A suitable conduit 28 is connected with the exhaust chamber 18 to conduct expansion engine exhaust away from the engine.

An inlet surge chamber 30 is provided at said one end of the cylinder, and consists of a cylindrical member 32 closed at its upper end by a cover plate 34 and secured at its lower end to the first named end-wall 10 in any suitable manner, as for example by a flange 36 secured to the lower end of the cylindrical member 32, flange 36 in turn being secured to end-wall 10 by threaded members 38.

I provide means to admit fluid under pressure to the interior of the cylinder 2 through the end-wall 10. To this end, a port 40 is provided in the end-wall; port 40 has a valve seat 42 which cooperates with a similar seat on a port closure 44. The port closure 44 is movable into port-open and port-closed positions, being guided in its movement by a port closure operator indicated generally at 46. The port closure 44 is preferably a hollow plug-like member having a projection 48 at one end and having secured to its other end a tubular member 50 which forms a part of the port closure operator 46. The projection end of the interior of closure 44 is threaded to receive a hollow nut 52 which extends up inside the tubular member 50, whereby the tubular member 50 is held between one end of nut 52 and port closure 44.

Tubular member 50 extends substantially throughout the surge chamber 30; in fact, tubular member 50 extends out through the end cap 34 into a cylindrical cap or sleeve 54. Cylindrical cap 54 is secured in an opening 56 in the end cap 34, and at its other end is plugged, as shown at 58. Tubular member 50 is similarly plugged as shown at 60.

Detent means indicated generally at 62 are provided to hold the port closure operator and the port closure in one of its operating positions; in the embodiment shown the operating position is the port-open position. The detent means has a member which is associated with the surge chamber cylindrical member 32 and another member which is associated with the port closure operator 46. Thus, between the upper end of cylindrical member 32 and the end cap 34, there are provided the balls of a ball detent. More specifically, a plate member 64 is provided with an annular shoulder 66 whereby it is secured in any satisfactory manner to the upper end of cylindrical member 32, and threaded members 68 secure the end cap to the plate member 64.

Radial flange 70 is made integral with the plate member 64, and balls 72 are held between the radial flange 70 and the inner face 74 of the end cap 34. The balls 72 are biased radially inward by means of a garter spring 76 acting against arcuate members 78. See especially Fig. 6 for this detail. The other portion of the detent consists of a groove 80 in the periphery of a bushing 82. Bushing 82 is secured to and moves with the tubular member 50 of the closure operator 46.

Bushing 82 has a sliding fit in a bore 84 provided in the end cap 34. The fit of bushing 82 in bore 84 forms part of guide means for the closure operator 46. Additional guide means are provided by the fact that tubular member 50 has a telescoping fit in cylindrical cap or sleeve 54. Thus, the end cap assembly provides guide means to center the closure operator 46 as it guides closure 44 between its port-open and port-closed positions.

The piston 6 is provided with at least one axial passage for the withdrawal of spent air or exhaust away from the expansion engine. Preferably, numerous exhaust passages 86 are provided through the piston throughout its length, these passages being substantially parallel with the cylindrical axis of the piston. See especially Fig. 8 for this detail.

A closure 88 is provided for the axial passage or passages. The upper surface of the piston has a seat 90 which cooperates with a surface on the closure 88 to seal the upper openings of the passages 86. Closure 88 is movable into passage-open and passage-closed positions, being shown in its passage-closed position in Figs. 1–4, and in its passage-open position in Fig. 5. A passage closure operator indicated generally at 92 is provided to guide the passage closure in its movement between the open and closed positions. As a part of the closure operator 92, there is provided a rod 94 having a stepped diameter at its lower end, of which the small diameter portion 96 extends through a projection 98 on the closure 88. A shoulder 100 is formed at the junction of the small diameter portion 96 and the larger portion of the rod, and the projection 98 is clamped between the shoulder 100 and a nut 102. The projection 98, small diameter portion 96 and nut 102 are all received in a centrally located bore or recess 104 in the upper face of the piston 6.

It will be noted that the rod 94 telescopes inside the tubular member 50 and inside the hollow nut 52. Near its lower end, rod 94 is provided with flats 106 to receive a suitable wrench in order that rod 94 may be held against turning when the nut 102 is applied. Also near its lower end, rod 94 fits in a recess or bore 108 in the closure 88, and in the annular space between bore 108 and rod 94 there is placed a coil spring 110, which acts at its one end against closure 88 and at its other end against nut 52 and therefore closure 44.

At its upper end, rod 94 is provided with a large diameter portion 112 which may if desired be a sleeve slipped over the end of the rod and secured thereto. Sleeve 112 has a sliding fit in the tubular member 50, and, along with the fit of projection 98 in the bore 104, provides guide means for the closure operator 92 to guide it in its movement. At its lower end, the large diameter portion 112 carries a cam surface 114 and a shoulder 116. The shoulder 116 is adapted to cooperate with the port closure 44, and more specifically with the nut 52 which is screwed into the port closure 44 to become a part thereof.

The cam surface 114 is part of a device to disengage the detent mechanism 62. Also included in the means to disengage the detent 62 is the resilient device indicated generally at 118. The resilient device 118 comprises a disc 120 which is preferably integral with bushing 82. Disc 120 has several stepped radial bores here shown as four in number (Fig. 7) as indicated at 122. In each bore 122 there is provided a ball 124 backed up by a pressure plate 126. A spring 128 in each bore is compressed between pressure plate 126 and a plug 130. It will be noted that the portion of the bore in which the ball lies is large enough to accommodate the ball and to permit free radial movement of the ball, and that the portion of the bore in which the pressure plate and the spring lie is a little larger in order to provide a shoulder to limit the radially inward movement of the pressure plate 126. The portion of the bore in which the plug 130 is situated is still larger and is threaded. Thus the threaded plug 130 is turned inward until it engages the shoulder provided by the juncture with the next smaller size portion of the bore 122.

Detent means are also provided to hold the passage closure in one operating position, which in the embodiment shown is the open position, as seen in Fig. 5. To that end, a shoulder is provided on the projection 98. This shoulder takes the form of a conical surface 132 which is opposed by another similar conical surface 134 on a resilient pressure plate 136. Balls 138 are located in the annular space between the two conical surfaces 132 and 134. A spring 140 biases the pressure plate 136 against the balls 138. Balls 138 are adapted to cooperate with a groove 142 provided in the cylindrical wall of the recess 104.

Referring again to the expansion engine cylinder more generally, it may be pointed out that the cylinder heads or end-walls 10 and 16 may be held in engagement with the cylinder 2 in any suitable manner, but a preferred method of holding the cylinder heads or end-walls 10 and 16 and the cylinder 2 together, as shown in Fig. 1, comprises a clamping sleeve 144 which is preferably provided in two parts so that it may readily be placed around the cylinder 2 and the end-walls 10 and 16. The two-part sleeve 144 is secured at its one end to a ring 146 which is of course also split, and at its upper end to a ring 148. Ring 148 is similarly provided in two parts. The lower split ring 146 engages the lower cylinder head or end-wall 16 while the upper split ring 148 is engaged by a split collar 150. Collar 150 carries clamping screws 152 which engage the upper surface of the end wall or upper cylinder head 10.

The piston rod 12 may be packed in any suitable conventional manner and is preferably packed at some point remote from the cylinder, preferably as far from the cylinder as possible. The packing may be conventional and is not shown here.

Reference is now made to Fig. 9, wherein is shown a modification of the resilient device to permit short cut-off or long cut-off. In Fig. 9, a resilient device 160 takes the place of device 118 of the first embodiment. In the device 160, one set of balls 162 is provided to effect short cut-off, and another set of balls 164 permits long cut-off.

Each of balls 162 is biased radially inward by a spring 166 which is encased in a bellows 168. Each spring 166 is preloaded by being compressed between a pressure plate 170 and a plug 172, the plug carrying a stop 174 which projects radially inward.

Each plug 172 is drilled as shown at 176, and the drilled passages are connected to a conduit 178 which is looped as shown at 180 before being joined to a valve 182. A conduit 184 connects valve 182 with the expansion engine exhaust line. A conduit 186 connects valve 182 with the inlet surge chamber 30'.

*Operation*

Referring again specifically to Fig. 1, the piston is shown as having just reached top dead center. Just before it reached this position, the port closure 44 was closed, as was also the passage closure 88. As the piston approaches top dead center, the upper surface of passage closure 88 engages the projection 48 of closure 44 and "cracks" or opens slightly the port closure 44. This is the position shown in Fig. 1.

With the port closure 44 open as shown in Fig. 1, air at the inlet pressure in the inlet surge chamber 30 is able to enter the upper end of the cylinder through the small clearance provided between port closure 44 and seat 42. With inlet pressure now applied to the under side of port closure 44, the force of spring 110 is sufficient to move the port closure 44 the rest of the distance into wide open (port-open) position, shown in Fig. 2, in which the detent mechanism 62 is engaged, i. e., balls 72 engage the groove 80. Air under pressure thereupon flows into the cylinder through the port 40, moving the piston 6 downward. Inlet pressure is of course applied to the upper face of the passage closure 88, holding closure 88 firmly on its seat 90. Consequently, as piston 6 moves downward under the influence of the compressed air operating on its upper surface, it carries the passage closure operator 92 along with it. As closure operator 92 moves downward, inside the tubular member 50, the cam surface 114 moves from the position shown in Fig. 2 to the position shown in Fig. 3 in which it is in engagement with the resilient device 118. This is the point of travel of the piston at which cut-off begins. The springs 128 are heavy enough to hold balls 124 in contact with the cam surface 114 so as to disengage balls 72 from their cooperating groove 80. Continued movement downward of the piston 6 eventually completely closes the valve or closure 44, moving the valve from the position shown in Fig. 3 to the position shown in Fig. 4.

Continued downward movement of piston 6 brings about expansion of the air in the cylinder. The external work which is performed during this expansion is done at the expense of the internal energy of the air, so the air temperature is reduced. It should be noted that as the piston 6 moves downward from the position seen in Fig. 4, closure 88 moves down with it, requiring that balls 124 ride "up" on the cam 114, compressing springs 128. Thereafter, the balls 124 ride on the large diameter surface of the portion 112.

As the piston 6 continues its downward movement, eventually the shoulder 116 on the passage closure operator 92 engages the upper end of nut 52. With port closure 44 already in its fully closed position, any further downward movement of the piston 6 must result in relative movement of the piston 6 and passage closure operator 92. This relative movement can in turn come about only by opening the passage closure 88. Accordingly, in the short distance that the piston moves from the time that shoulder 116 engages the upper end of nut 52 until piston 6 reaches bottom dead center, exhaust valve or passage closure 88 opens to uncover the upper ends of passages 86 in the piston 6. As the piston reaches bottom dead center, the balls 138 of the passage closure detent engage their cooperating groove 142 provided in the wall of recess 104 of the piston.

With the passage closure detent means engaged, the passage closure 88 remains in passage-open position as the piston moves upward. The passage closure 88 remains open until the upper surface of passage closure 88 engages the lower end of projection 48. Further upward movement of the piston causes the projection 48 to force the balls 138 out of their cooperating groove, closing the valve or passage closure 88. Still further upward movement of the piston opens the admission valve or port closure 44 as described above, and the cycle repeats.

The operation of the embodiment of Fig. 9 will now be discussed. For short cut-off, valve 182 is set to connect conduit 178 with conduit 186. This is done by turning the valve clockwise through 90° from the position shown in Fig. 9. With conduits 178 and 186 connected, the pressure on the plates 170 is the same on both sides, and the springs 166 are operative. In consequence, the balls 162 effect cut-off as explained above.

After balls 162 ride "up" on the cam surface 114' and are pressed against the large diameter portion 112', continued movement downward of rod 94' causes balls 164 also to ride "up" on the cam surface, and balls 164 have no effect on cut-off.

With valve 182 in the position shown, the pressure differential across plates 170 will bias them outward so that balls 162 will not effect cut-off. Balls 164 then operate to bring about long cut-off—i. e., cut-off after a longer period of admission of high pressure air.

It will be evident to those skilled in the art that I have here provided an expansion engine of greatly improved design, in which no valve push-rods extend through walls which separate chambers at different pressures. Accordingly, no valve push-rod packing is required and the losses always present with faulty packing are thereby greatly diminished, as the only rod packing required is that needed for the piston rod. Another advantage inherent in my improved design is the short distance of travel of the valves hereinabove called "closures." Other advantages will be apparent to those skilled in the art.

While there are in this application specifically described two forms which the invention may assume in practice, it will be understood that those forms of the same are shown for purposes of illustration, and that the invention may be modified and embodied in various other forms without departing from its spirit or the scope of the appended claims.

I claim:

1. In an expansion engine, a cylinder, an end wall for the cylinder and having a port, a closure for the port, a piston having at least one axial passage and reciprocably mounted in the cylinder, a closure for the axial passage, a closure operator for the port closure, another closure operator for the passage closure, detent means associated with the port closure operator to hold it in port-open position, other detent means associated with the passage closure operator to hold it in passage-open position, means to disengage the first-named detent means and close the port, and means to disengage said other detent means and close the passage.

2. An expansion engine as in claim 1, in which one closure operator fits inside and is reciprocable with respect to the other, the first-named detent-disengaging means including a shoulder provided on the inside closure operator.

3. An expansion engine as in claim 1, in which the second-named detent-disengaging means includes a projection on the port closure adapted to be engaged by the passage closure.

4. An expansion engine as in claim 3, in which the recess is centrally located in the high pressure end of the piston.

5. An expansion engine as in claim 1, in which one closure operator fits inside and is reciprocable with respect to the other, the first-named detent-disengaging means including a resilient device cooperable with the inside closure operator.

6. An expansion engine as in claim 1, in which the piston is provided with a recess having a groove, said other detent means including the groove.

7. In an expansion engine, a cylinder, an end wall for the cylinder and having a port, a closure for the port and movable into port-open and port-closed positions, a piston having at least one axial passage and reciprocably mounted in the cylinder, a closure for the axial passage and movable into passage-open and passage-closed positions, a closure operator for the port closure, another closure operator for the passage closure, means cooperable with the port closure to move the passage closure into passage-open position, means cooperable with the passage closure to move the port closure into port-open position, detent means associated with the port closure operator to hold it in port-open position, other detent means associated with the passage closure operator to hold it in passage-open position, means to disengage the first-named detent means and effect movement of the port closure to port-closed position, and means to disengage said other detent means and effect movement of the passage closure into passage-closed position.

8. An expansion engine as in claim 7, in which one closure operator fits inside and is reciprocable with respect to the other, the first-named means including a shoulder provided on the inside closure operator.

9. An expansion engine as in claim 8, in which the second-named means includes a projection on the port closure adapted to be engaged by the passage closure.

10. An expansion engine as in claim 9, in which the means to disengage the first detent means includes a resilient device cooperable with the inside closure operator.

11. An expansion engine as in claim 10, in which the means to disengage said other detent means includes the aforesaid projection on the port closure.

12. An expansion engine as in claim 11, in which the piston is provided with a recess having a groove, said other detent means including the groove.

13. An expansion engine as in claim 12, in which the recess is centrally located in the high pressure end of the piston, and in which the passage closure operator includes a member which extends into the recess.

14. An expansion engine as in claim 7, in which the second-named means includes a projection on the port closure adapted to be engaged by the passage closure.

15. An expansion engine as in claim 14, in which the means to disengage the first detent means includes a resilient device cooperable with the inside closure operator.

16. An expansion engine as in claim 15, in which the means to disengage said other detent means includes the aforesaid projection on the port closure.

17. An expansion engine as in claim 7, in which the piston is provided with a recess having a groove, said other detent means including the groove.

18. An expansion engine as in claim 17, in which the recess is centrally located in the high pressure end of the piston, and in which the passage closure operator includes a member which extends into the recess.

19. In a reciprocating expansion engine: a cylinder; a cylindrical inlet surge chamber adjacent one end of the cylinder and co-axial therewith; an end wall for said one end of the cylinder and separating the surge chamber and the cylinder interior; an exhaust chamber at the other end of the cylinder; a piston reciprocably mounted in the cylinder and having at least one axial passage therethrough; a piston rod secured to the piston and extending out through said other end of the cylinder; means to admit an elastic fluid from the surge chamber to the cylinder interior through the end wall and including a port in said end wall, a port closure for said port and movable into port-open and port-closed positions, and a port closure operator connected to guide the port closure in its movement between open and closed positions, the port closure operator consisting of an elongate member extending substantially throughout the surge chamber; means including said at least one axial passage and the exhaust chamber to withdraw spent elastic fluid from the cylinder; port closure operator guide means including a sleeve mounted on the end of the surge chamber, the port closure operator being mounted to reciprocate in said sleeve; and detent means having a member carried by the surge chamber and another member on the port closure operator, the detent means serving to hold the port closure operator in one position.

20. In a reciprocating expansion engine: a cylinder; an end wall for one end of the cylinder; an exhaust chamber at the other end of the cylinder; a piston reciprocably mounted in the cylinder and having at least one axial passage therethrough; a piston rod secured to the piston and extending out through said other end of the cylinder and through the exhaust chamber; means to admit an elastic fluid to the cylinder through the end wall including a port in said end wall, a port closure for said port and movable into port-open and port-closed positions, and a port closure operator connected to guide the port closure in its movement between open and closed positions; means carried by said one end to guide the port closure operator; means including said at least one axial passage and the exhaust chamber to withdraw spent elastic fluid from the cylinder including a passage closure movable into passage-open and passage-closed positions and including also a passage closure operator connected to guide the passage closure in its movement between open and closed positions; and guide surfaces provided on the two operators, the guide surfaces cooperating to provide at least part of the guide means for the passage closure operator.

21. An expansion engine as in claim 20, in which the last-named guide means also includes other mutually cooperable guide surfaces on the passage closure operator and the piston.

22. In an expansion engine as in claim 21, detent means cooperable with the port closure operator to hold it in port-open position, and other detent means cooperable with the passage closure operator to hold it in passage-open position.

23. In an expansion engine, a cylinder, an end wall for the cylinder and having a port, a closure for the port, a piston having at least one axial passage and reciprocably mounted in the cylinder, a closure for the axial passage, a closure operator for the port closure, another closure operator for the passage closure, detent means associated with the port closure operator to hold it in port-open position, other detent means associated with the passage closure operator to hold it in passage-open position, means to disengage the first-named detent means and close the port, and means to disengage said other detent means and close the passage, said port closing means including a resilient device adapted to resist yielding until the port is closed and to yield after the port is closed.

24. An expansion engine as in claim 23, in which the resilient device embodies means to effect short cut-off and means to effect long cut-off.

25. An expansion engine as in claim 24, and pressure operated means to render ineffective one of the means to effect cut-off.

26. An expansion engine as in claim 25, in which the resilient device is carried by the port closure operator, the first-named disengaging means including also a cam surface cooperable with the resilient device to engage the short cut-off means unless it is rendered ineffective by the pressure operated means.

27. An expansion engine as in claim 26, in which the resilient device includes a spring to bias the short cut-off means and another spring to bias the long cut-off means, and in which the pressure operated means includes a pressure sensitive bellows enclosing said one of the means to effect cut-off and means to vary the pressure to which the bellows is sensitive.

28. In a reciprocating expansion engine, a cylinder, an inlet surge chamber adjacent one end of the cylinder, an end wall for said one end of the cylinder and separating the surge chamber and the cylinder interior, an exhaust chamber at the other end of the cylinder, a piston reciprocably mounted in the cylinder and having at least one axial passage therethrough, a piston rod secured to the piston and extending out through said other end of the cylinder, means including said at least one axial passage and the exhaust chamber to withdraw spent elastic fluid from the cylinder, a port in said end wall, a port closure for said port and movable into port-open and port-closed positions, a port closure operator connected to guide the port closure in its movement between open and closed positions, detent means cooperable with the port closure to hold it and the port in port-open position, and means to disengage the detent means to effect closure of the port closure, said disengaging means including a resilient device having means to effect short cut-off and means to effect long cut-off.

29. An expansion engine as in claim 28, in which the resilient device is disposed in the surge chamber and includes a spring, a bellows device encasing the spring, and means alternately to subject the interior of the bellows device to surge chamber pressure and to a different pressure.

30. An expansion engine as in claim 29, in which the last-named means includes a valve connected with the surge chamber and with the exhaust chamber and movable to connect the bellows interior with one chamber or the other.

ROBERT W. HUGHES.

References Cited in the file of this patent

UNITED STATES PATENTS

| Number | Name | Date |
|---|---|---|
| 671,394 | Curtis | Apr. 2, 1901 |
| 728,651 | Albright | May 19, 1903 |
| 1,045,630 | Stumpf | Nov. 26, 1912 |
| 1,088,155 | Kinney | Feb. 24, 1914 |
| 2,028,938 | Logette et al. | Jan. 28, 1936 |
| 2,408,075 | Kowalski, Jr. et al. | Sept. 24, 1946 |
| 2,443,568 | Palm | June 15, 1948 |